United States Patent
Imai

(10) Patent No.: US 8,482,232 B2
(45) Date of Patent: Jul. 9, 2013

(54) MOTOR DRIVE CIRCUIT

(75) Inventor: Toshiyuki Imai, Gunma-ken (JP)

(73) Assignee: ON Semiconductor Trading, Ltd., Hamilton (BM)

( * ) Notice: Subject to any disclaimer, the term of this patent is extended or adjusted under 35 U.S.C. 154(b) by 100 days.

(21) Appl. No.: 13/215,652

(22) Filed: Aug. 23, 2011

(65) Prior Publication Data
US 2012/0049775 A1 Mar. 1, 2012

(30) Foreign Application Priority Data
Aug. 25, 2010 (JP) ................. 2010-188599

(51) Int. Cl.
| H03K 5/00 | (2006.01) |
| H02P 6/14 | (2006.01) |
| H02P 1/26 | (2006.01) |
| H02P 27/04 | (2006.01) |
| H02P 7/00 | (2006.01) |
| H02P 23/00 | (2006.01) |

(52) U.S. Cl.
USPC ........ 318/400.02; 318/400.26; 318/269; 318/767; 318/799; 318/801

(58) Field of Classification Search
USPC ............. 318/400, 400.2, 400.26, 801, 269, 318/767, 799
See application file for complete search history.

(56) References Cited

U.S. PATENT DOCUMENTS

| 4,494,056 A * | 1/1985 | Nishijima et al. | 318/269 |
| 5,319,290 A * | 6/1994 | Yoshino et al. | 318/400.2 |
| 2004/0056632 A1* | 3/2004 | Nakatsugawa et al. | 318/801 |

FOREIGN PATENT DOCUMENTS

JP 5161388 A 6/1993

* cited by examiner

*Primary Examiner* — Eduardo Colon Santana
*Assistant Examiner* — Bickey Dhakal
(74) *Attorney, Agent, or Firm* — Osha Liang LLP

(57) ABSTRACT

A motor drive circuit configured to supply drive currents to drive coils with a plurality of phases of a motor to drive the motor, includes: a trapezoidal wave signal generation circuit configured to output a trapezoidal wave signal whose inclination is changed with a rotation speed of the motor or a target rotation speed of the motor; and a plurality of output transistors configured to output the drive current to the drive coils, respectively, in accordance with the trapezoidal wave signal.

10 Claims, 10 Drawing Sheets

MOTOR DRIVE CIRCUIT

CROSS-REFERENCE TO RELATED APPLICATION

This application claims the benefit of priority to Japanese Patent Application No. 2010-188599, filed Aug. 25, 2010, of which full contents are incorporated herein by reference.

BACKGROUND OF THE INVENTION

1. Field of the Invention

The present invention relates to a motor drive circuit.

2. Description of the Related Art

As a drive system of a brushless DC motor including drive coils with a plurality of phases (three-phase, for example), known is a PWM (Pulse Width Modulation) drive system in which the motor rotates at a rotation speed according to a duty ratio of a signal supplied to an output transistor. Also, a drive system called a linear drive system, PAM (Pulse Amplitude Modulation) drive system or the like is known, and with the linear drive system (PAM drive system), the motor rotates at a rotation speed according to an amplitude of a signal supplied to the output transistor.

Further, for the purpose of silencing of the brushless DC motor or the like, known is a soft switching drive system in which 180-degree energization is performed. For example, Japanese Patent Laid-Open Publication No. H5-161388 discloses a drive circuit of a brushless motor in which a rotation position of a rotor can also be detected by a sensorless drive system without using a position detection element such as a Hall element by switching between 120-degree energization and 180-degree energization.

As such, the brushless DC motor can be driven by the soft switching drive system, including the case of the sensorless drive system, thereby realizing silencing.

However, a drive current supplied to the drive coil of the motor has the phase thereof delayed with respect to a drive voltage applied to the drive coil, due to an influence of inductive reactance. Thus, at the time of phase switching in the soft switching drive system, a drive current may flow less easily or a counter torque component may be generated.

Also, the higher the rotation speed of the motor becomes, the greater the inductive reactance becomes, resulting in the remarkable phase delay of the drive current. Thus, even if the drive current is increased in order to rotate the motor at a high speed, the motor cannot be increased in rotation speed sufficiently.

SUMMARY OF THE INVENTION

A motor drive circuit according to an aspect of the present invention, which supplies drive currents to drive coils with a plurality of phases of a motor to drive the motor, includes: a trapezoidal wave signal generation circuit configured to output a trapezoidal wave signal whose inclination is changed with a rotation speed of the motor or a target rotation speed of the motor; and a plurality of output transistors configured to output the drive current to the drive coils, respectively, in accordance with the trapezoidal wave signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

===Configuration of Entire Motor Drive Circuit===

A configuration of an entire motor drive circuit according to an embodiment of the present invention will be described hereinafter with reference to FIG. 1.

Figure 1:
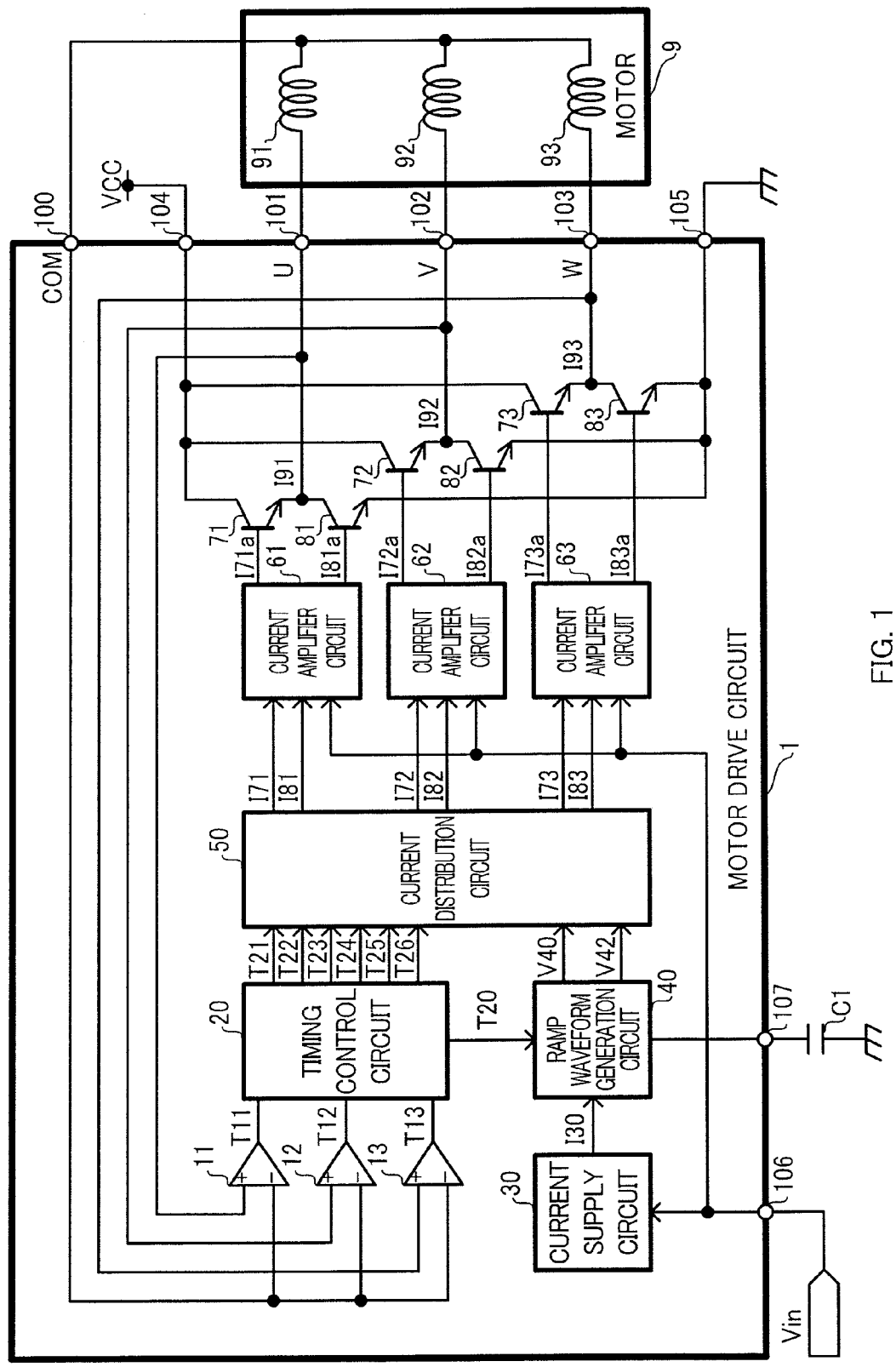
FIG. 1 is a circuit block diagram illustrating a configuration of an entire motor drive circuit according to an embodiment of the present invention.

A motor drive circuit 1 illustrated in FIG. 1 is configured to drive a motor 9 employing a sensorless drive system, including three-phase drive coils 91 to 93, and is configured as an integrated circuit including terminals 100 to 107. The motor drive circuit 1 includes comparator circuits 11 to 13, a timing control circuit 20, a current supply circuit 30, a ramp waveform generation circuit 40, a current distribution circuit 50, current amplifier circuits 61 to 63, and output transistors 71 to 73 and 81 to 83. Further, a capacitor C1 in addition to a motor 9 is connected to the motor drive circuit 1.

In an embodiment of the present invention, the comparator circuits 11 to 13 correspond to a position detection circuit; the current supply circuit 30, the ramp waveform generation circuit 40, and the current distribution circuit 50 correspond to a trapezoidal wave signal generation circuit; and the current amplifier circuits 61 to 63 correspond to an amplifier circuit. A description will hereinafter be given of a case where an NPN transistor is used as an example of each of the output transistors. Further, it is assumed that phases of the drive coils 91 to 93 are U-phase, V-phase, and W-phase, respectively.

All the collectors of the output transistors 71 to 73 on a high side (power supply side) are connected to a (motor) power supply potential VCC through the terminal 104. All the emitters of the output transistors 81 to 83 on a low side (ground side) are connected to a ground potential through the terminal 105. Further, the output transistors 71 to 73 are connected in series to the output transistors 81 to 83, respectively, and connection points therebetween are connected to the terminals 101 to 103, respectively. The drive coils 91 to 93 are connected to the terminals 101 to 103, respectively, and the neutral points of the drive coils 91 to 93 are connected to the terminal 100.

Non-inverting inputs of the comparator circuits 11 to 13 are connected to the terminals 101 to 103, respectively, and all inverting inputs there of are connected to the terminal 100. Timing signals T11 to T13 outputted from the comparator circuits 11 to 13, respectively, are inputted to the timing control circuit 20. The timing signals T20 to T26 are outputted from the timing control circuit 20. Among the timing signals T20 to T26, the timing signals T21 to T26 correspond to energization timing signals.

A speed control voltage Vin is inputted to the current supply circuit 30 through the terminal 106, and a charging/discharging current I30 is outputted from the current supply circuit 30. The capacitor C1 is connected to the ramp waveform generation circuit 40 through the terminal 107, and the timing signal T20 and the charging/discharging current I30 are inputted to the ramp waveform generation circuit 40. A voltage V40 across the capacitor c1 and an intermediate voltage V42 are outputted from the ramp waveform generation circuit 40. The timing signals T21 to T26, the voltage V40 across the capacitor C1, and the intermediate voltage V42 are inputted to the current distribution circuit 50. Trapezoidal wave signals I71 to I73 and I81 to I83 are outputted from the current distribution circuit 50.

The trapezoidal wave signals I71 and I81 and the speed control voltage Vin are inputted to the current amplifier circuit 61, and the trapezoidal wave signals I71a and I81a are outputted from the current amplifier circuit 61. The trapezoidal wave signals I72 and I82 and the speed control voltage Vin are inputted to the current amplifier circuit 62, and the trapezoidal wave signals I72a and I82a are outputted from the current amplifier circuit 62. Further, the trapezoidal wave signals I73 and I83 and the speed control voltage Vin are inputted to the current amplifier circuit 63, and the trapezoidal wave signals I73a and I83a are outputted from the current amplifier circuit 63. The trapezoidal wave signals I71a to I73a and I81a to I83a are inputted to bases of the output transistors 71 to 73 and 81 to 83, respectively.

===Configuration of Timing Control Circuit===

Figure 2:
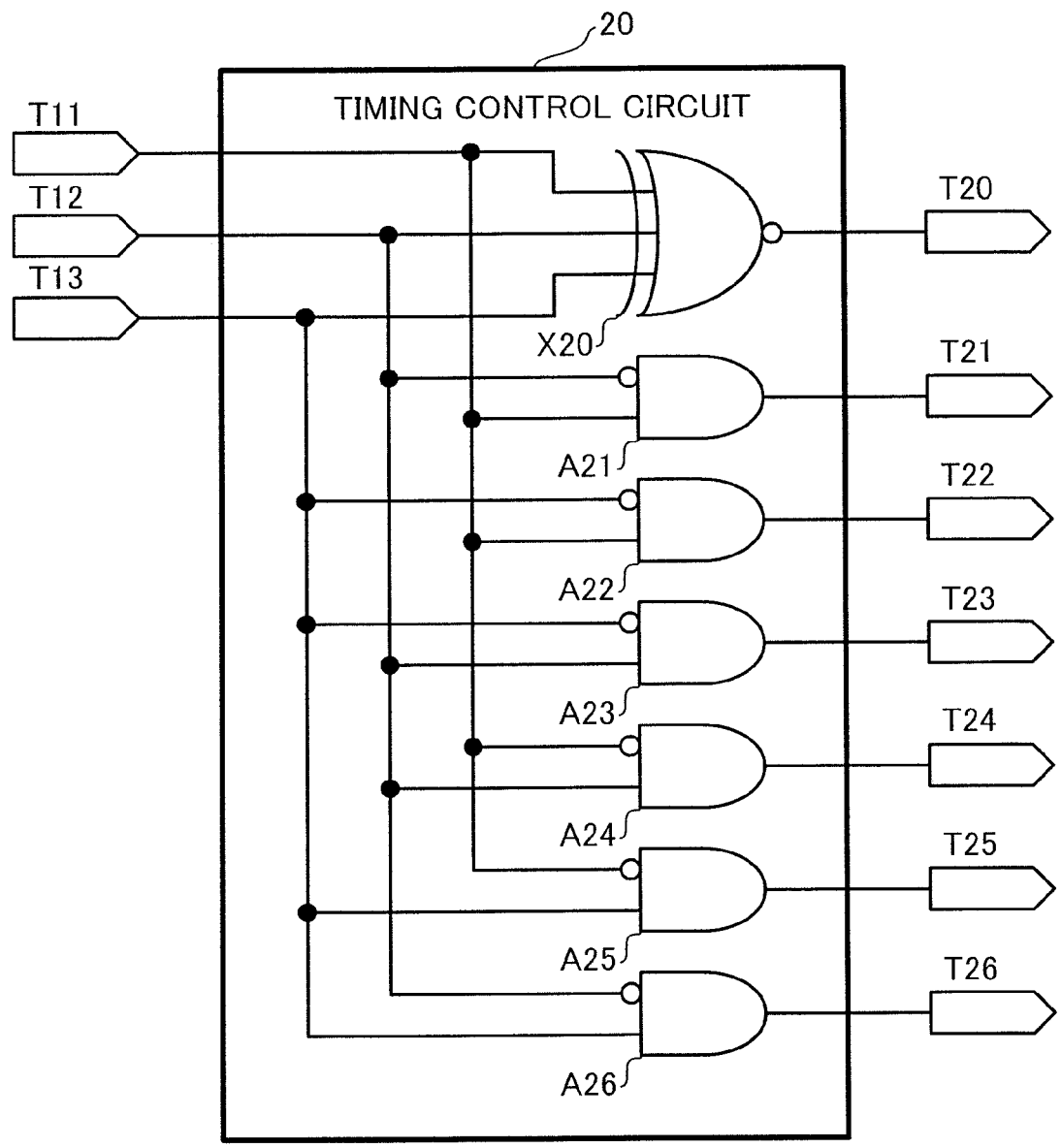
FIG. 2 is a circuit block diagram illustrating an example of a specific configuration of a timing control circuit 20.

Subsequently, a more specific configuration of the timing control circuit 20 will be described with reference to FIG. 2.

The timing control circuit 20 includes a three-input XNOR circuit (exclusive NOR) X20 and two-input AND circuits (logical product circuits) A21 to A26.

The timing signals T11 to T13 are inputted to the XNOR circuit X20, and the timing signal T20 is outputted from the XNOR circuit X20.

The timing signal T11 is inputted to the AND circuits A21 and A22, and its inverting signal is inputted to the AND circuits A24 and A25. The timing signal T12 is inputted to the AND circuits A23 and A24, and its inverting signal is inputted to the AND circuits A26 and A21. Further, the timing signal T13 is inputted into the AND circuits A25 and A26, and its inverting signal is inputted to the AND circuits A22 and A23. The timing signals T21 to T26 are outputted from the AND circuits A21 to A26.

===Configuration of Current Supply Circuit===

Figure 3:
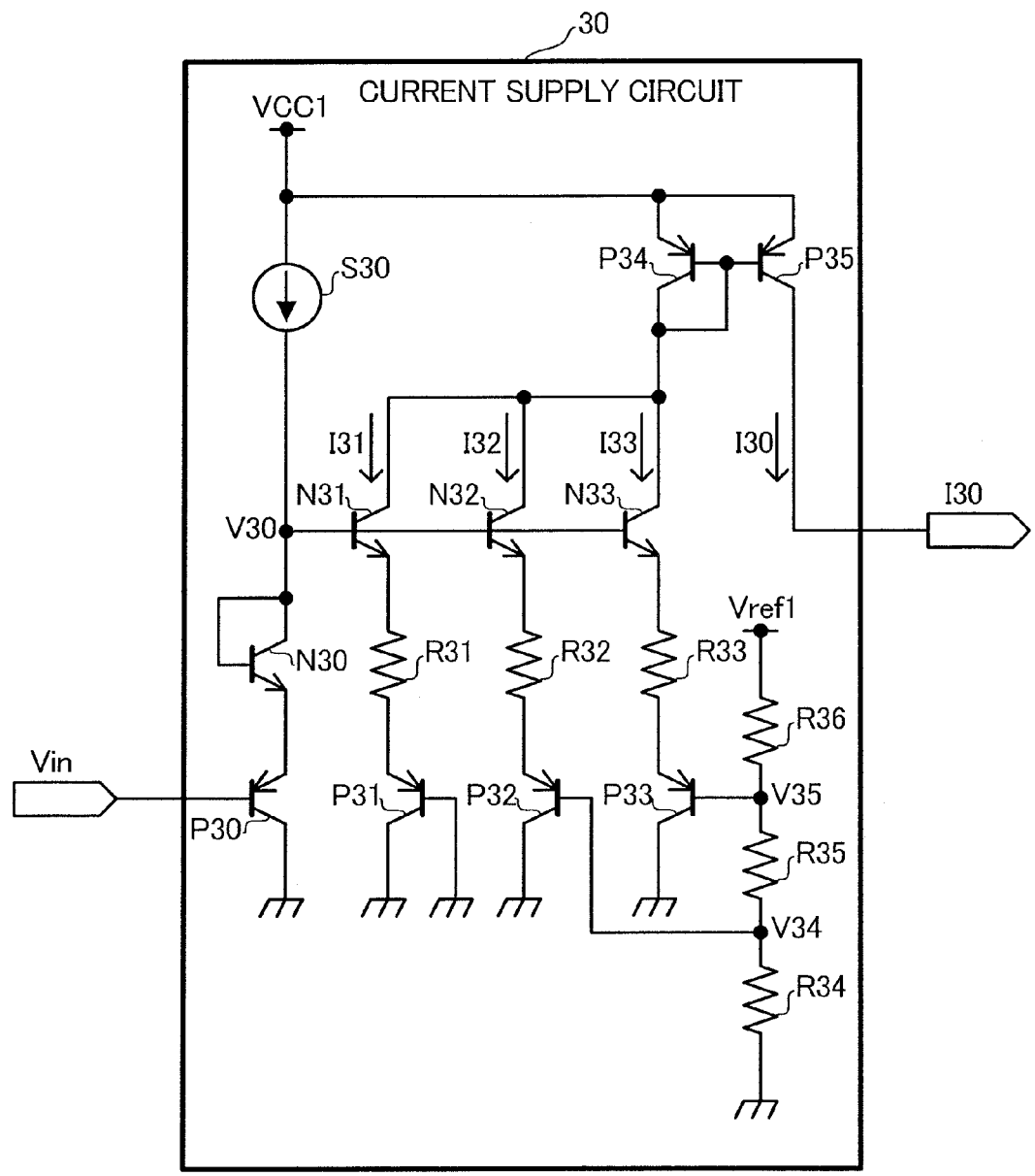
FIG. 3 is a circuit block diagram illustrating an example of a specific configuration of a current supply circuit 30.

Subsequently, a more specific configuration of the current supply circuit 30 will be described with reference to FIG. 3.

The current supply circuit 30 includes a current source S30, (PNP) transistors P30 to P35, (NPN) transistors N30 to N33, and resistors R31 to R36.

The current source S30 connected to an (internal) power supply potential VCC1, the diode-connected transistor N30, and the transistor P30 whose collector is connected to the ground potential are connected in series in this order. The speed control voltage Vin is inputted to the base of the transistor P30.

An emitter of the diode-connected transistor P34 is connected to the power supply potential VCC1, and a collector is connected to collectors of the transistors N31 to N33. The transistor P35 makes up a current mirror circuit together with the transistor P34, and the charging/discharging current I30 is outputted from a collector of the transistor P35. It is assumed that the size (emitter area) of the transistor P35 is equal to the size of the transistor P34.

All the bases of the transistors N31 to N33 are connected to a connection point between the current source S30 and the transistor N30. An emitter of the transistor P31 is connected to an emitter of the transistor N31 through the resistor R31, and a collector and a base thereof are connected to the ground potential. Further, an emitter of the transistor P32 is connected to an emitter of the transistor N32 through the resistor R32, and a collector thereof is connected to the ground potential. An emitter of the transistor P33 is connected to an emitter of the transistor N33 through the resistor R33, and a collector thereof is connected to the ground potential.

The resistors R34 to R36 are connected in series in this order. One end of the resistor R34 is connected to the ground potential, and one end of the resistor R36 is connected to a reference potential Vref1. A base of the transistor P32 is connected to a connection point between the resistors R34 and R35, and a base of the transistor P33 is connected to a connection point between the resistors R35 and R36.

===Configuration of Ramp Waveform Generation Circuit===

Figure 4:
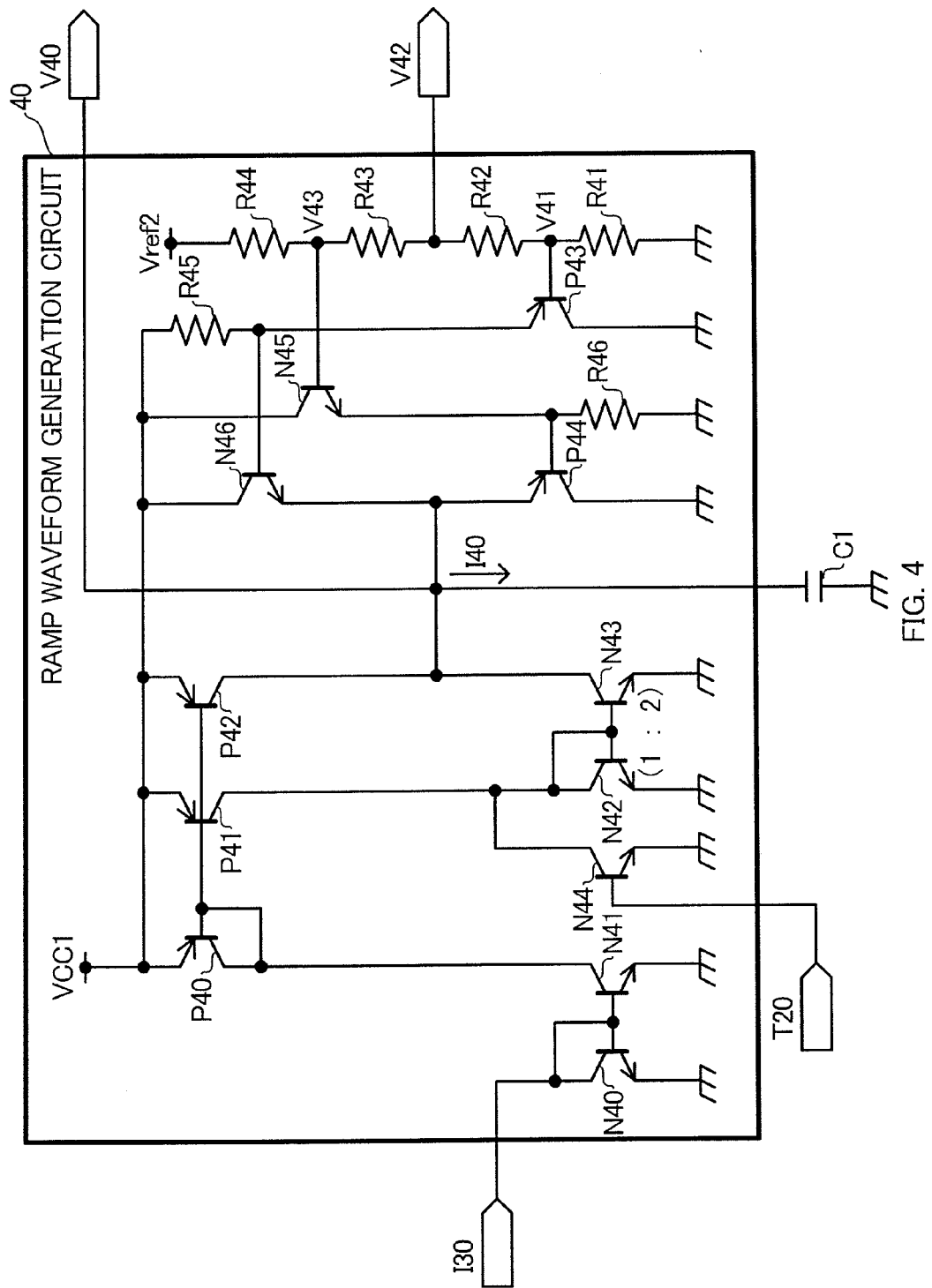
FIG. 4 is a circuit block diagram illustrating an example of a specific configuration of a ramp waveform generation circuit 40.

Subsequently, a more specific configuration of the ramp waveform generation circuit 40 will be described with reference to FIG. 4.

The ramp waveform generation circuit 40 includes (PNP) transistors P40 to P44, (NPN) transistors N40 to N46, and resistors R41 to R46. In the following description, unless otherwise specified, it is assumed that the transistors making up each of current mirror circuits are equal in size.

The charging/discharging current I30 is supplied to a collector of the diode-connected transistor N40, and an emitter is connected to the ground potential. The transistor N41 makes up the current mirror circuit together with the transistor N40. Further, an emitter of the diode-connected transistor P40 is connected to the power supply potential VCC1, and a collector is connected to a collector of the transistor N41. Each of the transistors P41 and P42 makes up the current mirror circuit together with the transistor P40.

A collector of the diode-connected transistor N42 is connected to a collector of the transistor P41, and an emitter thereof is connected to the ground potential. The transistor N43 makes up the current mirror circuit together with the transistor N42, and a collector of the transistor N43 is connected to a collector of the transistor P42. Further, a collector of the transistor N44 is connected to a connection point between the transistors P41 and N42, an emitter thereof is connected to the ground potential, and the timing signal T20 is inputted to a base thereof. The size of the transistor N43 is twice the size of the transistor N42.

One end of the capacitor C1 is connected to the ground potential. The other end of the capacitor C1 is connected to a connection point between the transistors P42 and N43, which is an output node of the voltage V40 across the capacitor C1.

The resistors R41 to R44 are connected in series in this order. One end of the resistor R41 is connected to the ground potential, and one end of the resistor R44 is connected to a reference voltage Vref2. A connection point between the resistors R42 and R43 is an output node of the intermediate voltage V42.

An emitter of the transistor P43 is connected to the power supply potential VCC1 through the resistor R45, a collector thereof is connected to the ground potential, and a base thereof is connected to a connection point between the resistors R41 and R42. A collector of the transistor N45 is connected to the power supply potential VCC1, an emitter thereof is connected to the ground potential through the resistor R46, and a base thereof is connected to a connection point between the resistors R43 and R44.

A collector of the transistor N46 is connected to the power supply potential VCC1, and a base thereof is connected to a connection point between the resistor R45 and the transistor P43. An emitter of the transistor P44 is connected to an emitter of the transistor N46, a collector is connected to the ground potential, and a base is connected to a connection point between the transistor N45 and the resistor R46. A connection point between the transistors N46 and P44 is connected to the output node of the voltage V40 across the capacitor C1.

===Configuration of Current Distribution Circuit===

Figure 5:
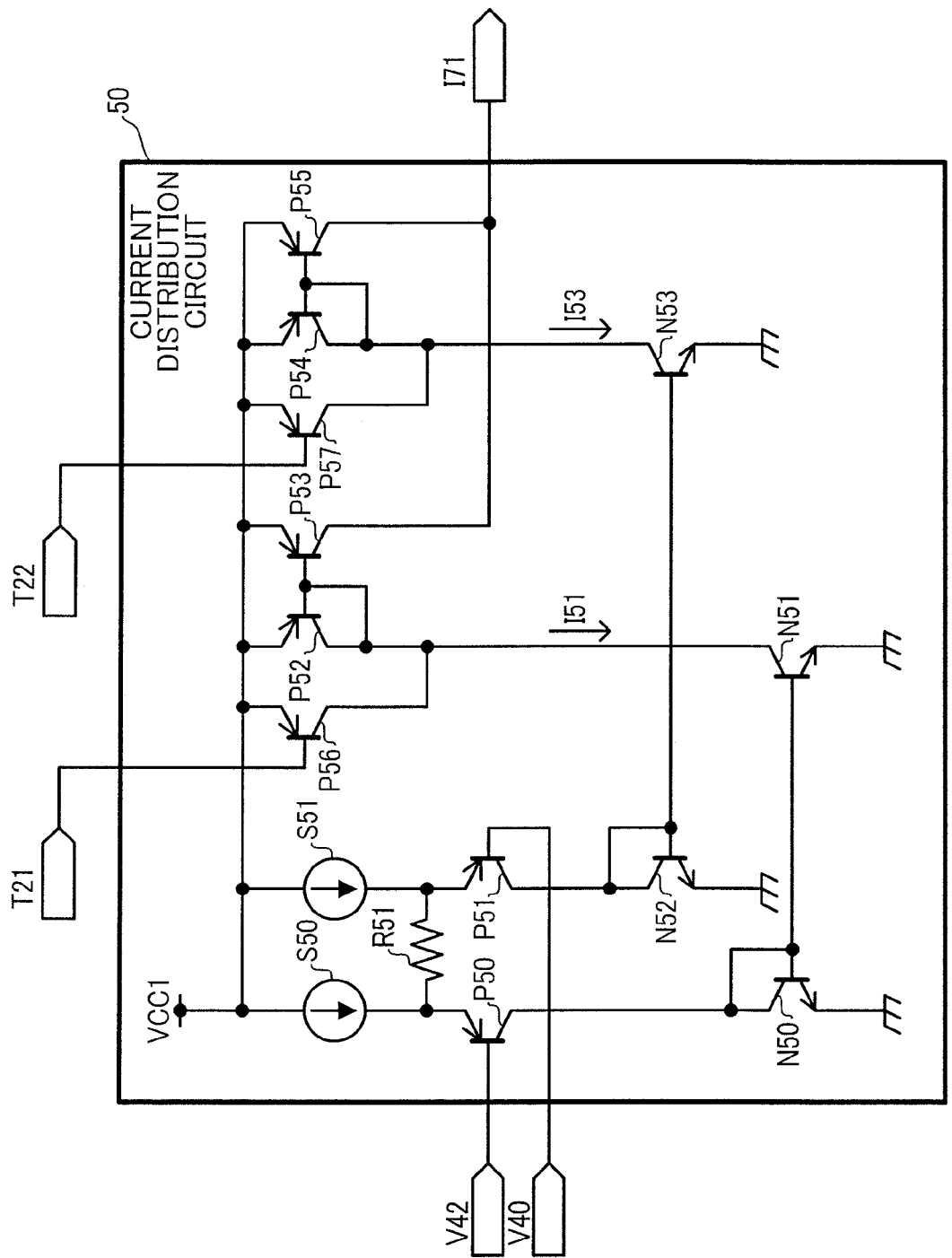
FIG. 5 is a circuit block diagram illustrating an example of a specific configuration of a current distribution circuit 50.

Subsequently, a more specific configuration of the current distribution circuit 50 will be described with reference to FIG. 5. FIG. 5 illustrates only a circuit configured to output the trapezoidal wave signal I71 in the current distribution circuit 50.

The current distribution circuit 50 includes current sources S50 and S51, (PNP) transistors P50 to P57, (NPN) transistors N50 to N53, and a resistor R51. In the following description, it is assumed that the transistors making up each of current mirror circuits are equal in size.

An emitter of the transistor P50 is connected to the current source S50 that is connected to the power supply potential VCC1, and the intermediate voltage V42 is inputted to a base thereof. An emitter of the transistor P51 is connected to the current source S51 that is connected to the power supply potential VCC1, and the voltage V40 across the capacitor C1 is inputted to a base thereof. Further, a connection point between the current source S50 and the transistor P50, and a connection point between the current source S51 and the transistor P51 are connected to each other through the resistor R51.

A collector of the diode-connected transistor N50 is connected to a collector of the transistor P50, and an emitter thereof is connected to the ground potential. A collector of the diode-connected transistor N52 is connected to a collector of the transistor P51, and an emitter thereof is connected to the ground potential. The transistor N51 makes up a current mirror circuit together with the transistor N50, and the transistor N53 makes up a current mirror circuit together with the transistor N52.

An emitter of the diode-connected transistor P52 is connected to the power supply potential VCC1, and a collector current I51 of the transistor N51 is supplied to a collector of the transistor P52. The transistor P53 makes up a current mirror circuit together with the transistor P52, and a collector of the transistor P53 is connected to an output node of the trapezoidal wave signal I71. Further, an emitter of the transistor P56 is connected to the power supply potential VCC1, a collector thereof is connected to a connection point between the transistors P52 and N51, and the timing signal T21 is inputted to a base thereof.

An emitter of the diode-connected transistor P54 is connected to the power supply potential VCC1, and a collector current I53 of the transistor N53 is supplied to a collector of the transistor 54. The transistor P55 makes up a current mirror circuit together with the transistor P54, and a collector of the transistor P55 is connected to an output node of the trapezoidal wave signal I71. Further, an emitter of the transistor P57 is connected to the power supply potential VCC1, a collector thereof is connected to a connection point between the transistors P54 and N53, and the timing signal T22 is inputted to a base thereof.

===Operation of Motor Drive Circuit===

An operation of the motor drive circuit according to an embodiment will hereinafter be described with reference to FIGS. 6 to 11 as appropriate. In the following description, a base-emitter voltage of each PNP transistor is referred to as Vpbe, and a base-emitter voltage of each of the NPN transistors is referred to Vnbe.

The comparator circuit 11 is configured to compare a voltage U of the terminal 101 (U-phase) and a voltage COM of the terminal 100 (a neutral point of the drive coils 91 to 93). Similarly, the comparator circuit 12 is configured to compare a voltage V of the terminal 102 (V-phase) and the voltage COM, and the comparator circuit 13 is configured to compare a voltage W of the terminal 103 (W-phase) and the voltage COM. The comparator circuits 11 to 13 is configured to output the respective comparison results as the timing signals T11 to T13, which are binary signals, each indicating a rotation position of a rotor of the motor 9 corresponding to each of the phases.

Figure 6:
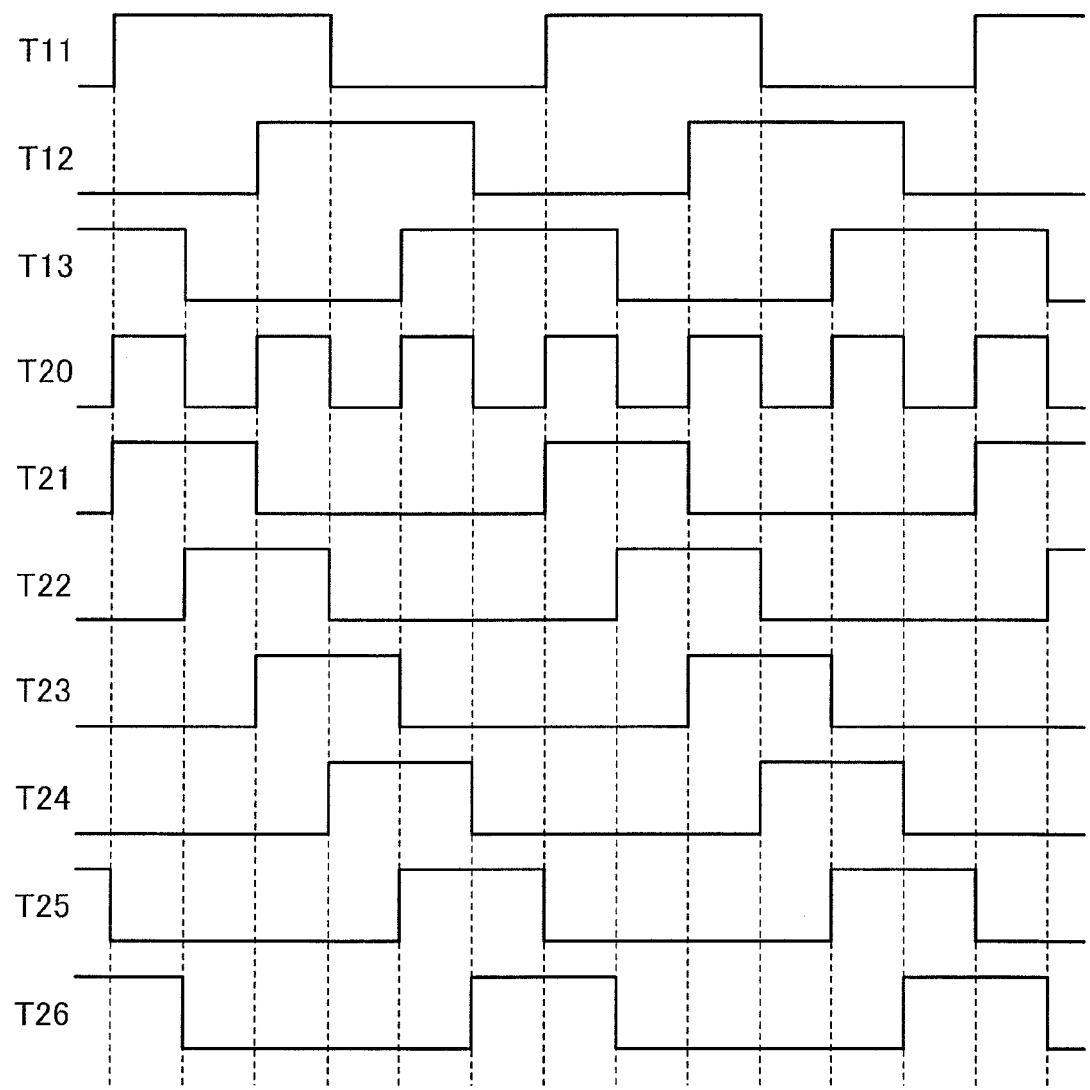
FIG. 6 is a diagram for explaining an operation of a timing control circuit 20.

The timing control circuit 20 outputs the timing signals T20 to T26 on the basis of the timing signals T11 to T13. Here, FIG. 6 illustrates the relationship between the timing signals T11 to T13 inputted to the timing control circuit 20 and the timing signals T20 to T26 outputted from the timing control circuit 20.

The timing signals T11 to T13 indicate switching timings or three-phases in 180-degree energization, and the phases are in the same period and are shifted from one another by 120-degree. The timing signal T20 switches a level thereof at a rising edge and a falling edge of the timing signals t11 to T13. Further, the timing signals T21 to T26 indicate switching timings of three phases in 120-degree energization, and the phases are in the same period and are shifted from one another by 60 degrees. The timing signals T21 and T24 indicate timings for energizing the U-phase, the timing signals T22 and T25 indicate timings for energizing the V-phase, and the timing signals T23 and T26 indicate timings for energizing the W-phase.

The current supply circuit 30 outputs the charging/discharging current I30 in accordance with the speed control voltage Vin which indicates a target rotation speed of the motor 9. Here, assuming that the voltage at a connection point between the current source S30 and the transistor N30 is V30, the voltage at a connection point between the resistors R34 and R35 is V34, and the voltage at a connection point between the resistors R35 and R36 is V35, the respective voltages V31 to V33 across the resistors R31 to R33 are expressed as follows:

$$V31=(V30-Vpbe)-Vpbe=Vin;$$

$$V32=(V30-Vpbe)-(V34+Vpbe)=Vin-V34;$$

$$V33=(V30-Vpbe)-(V35+Vpbe)=Vin-V35$$

Further, assuming that the collector currents of the transistors N31 to N33 are I31 to I33, respectively, the charging/discharging current I30 is expressed as follows, in the case of Vin≦V34:

```
        I30   = I31
              = Vin/R31
   in the case of V34 < Vin ≦ V35:
        I30   = I31 + I32
              = Vin/R31 + (Vin − V34)/R32
   and in the case of V35 < Vin:
        I30   = I31 + I32 + I33
              = Vin/R31 + (Vin − V34)/R32 + (Vin − V35)/R33
```

Figure 7:
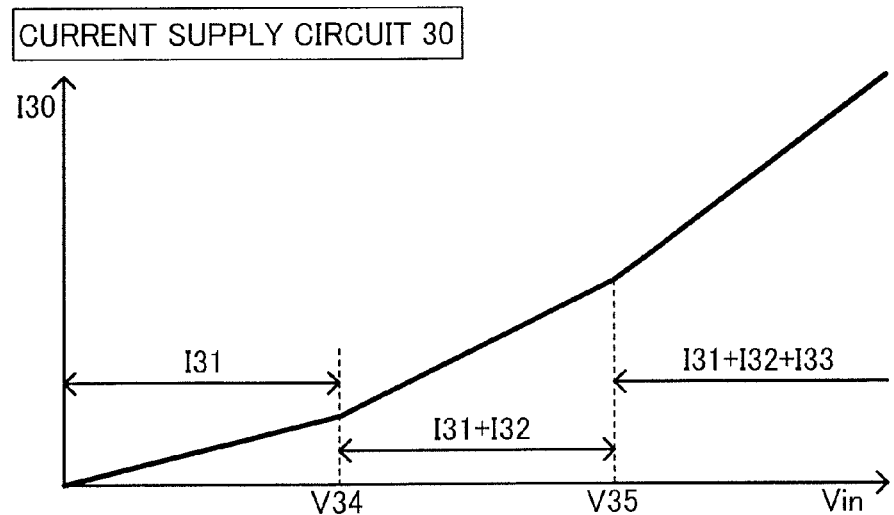
FIG. 7 a diagram for explaining an operation of a current supply circuit 30.

Therefore, the charging/discharging current I30 increases, as illustrated in FIG. 7, in accordance with the increase in the speed control voltage Vin. The charging/discharging current I30 increases more greatly as compared to the increase in proportion to the increase in the speed control voltage Vin in an accelerated manner.

Figure 8:
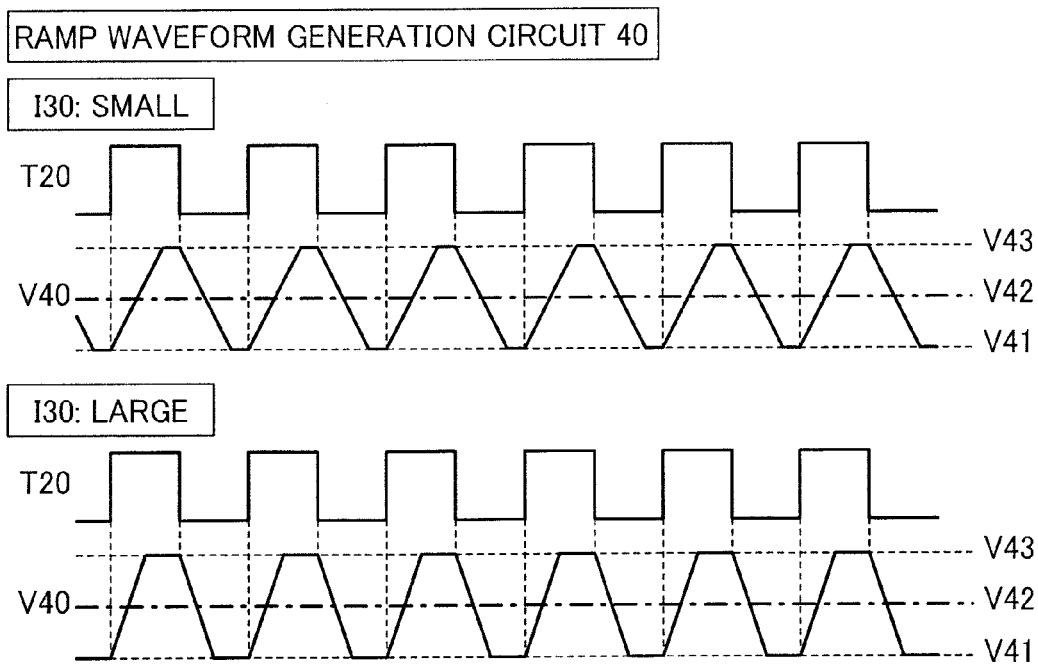
FIG. 8 is a diagram for explaining an operation of a ramp waveform generation circuit 40.

The ramp waveform generation circuit 40 is configured to charge or discharge the capacitor C1 in accordance with the level of the timing signal T20. Here, the relationship between timing signal T20 inputted to the ramp waveform generation circuit 40 and the voltage V40 across the capacitor C1 outputted from the ramp waveform generation circuit 40 is illustrated in FIG. 8.

As described above, since the transistors making up each of current mirror circuits are equal in size except for the transistors N42 and N43, the collector currents of the transistors P41 and P42 become equal to the charging/discharging current I30. When the timing signal T20 goes high (high level), the collector current of the transistor P41 flows through the transistor N44, and the current no longer flows through the transistors N42 and N43.

Therefore, assuming that the current supplied to the capacitor C1 is I40, if the voltage V40 across the capacitor C1 is differentiated with respect to a time t, the following equation is given:

$$dV40/dt = I40/C1 = I30/C1$$

and thus, the capacitor C1 is charged by the charging/discharging current I30, and the voltage V40 thereacross increases at a constant inclination. When the voltage V40 across the capacitor C1 reaches the voltage V43 of a connection point between the resistors R43 and R44, a current starts flowing through the transistor P44, and the voltage finishes increasing and becomes constant.

On the other hand, if the timing signal T20 goes low (low level), the collector current of the transistor P41 no longer flows through the transistor N44, and the collector current twice as great as the charging/discharging current I30 flows through the transistor N43.

Therefore, if the voltage V40 across the capacity C1 is differentiated with respect to the time t, the following equation is given:

$$dV40/dt = I40/C1 = -I30/C1$$

and thus, the capacitor C1 is discharged by the charging/discharging current I30, and the voltage V40 across the capacitor C1 is decreased at constant inclination. When the voltage V40 across the capacitor C1 reaches a voltage V41 at a connection point between the resistors R41 and R42, the current starts flowing through the transistor N46, and thus the voltage finishes decreasing and becomes constant.

As such, the voltage V40 across the capacitor C1 forms a ramp waveform which starts rising at the rising edge of the timing signal T20 and starts falling at the falling edge. The ramp waveform has inclination according to the charging/discharging current I30 with an upper limit of the voltages V43 and a lower limit of V41. It is assumed that the resistors R42 and R43 are equal in resistance value, and the intermediate voltage V42 is given as follows:

$$V42 = (V41 + V43)/2.$$

Figure 9:
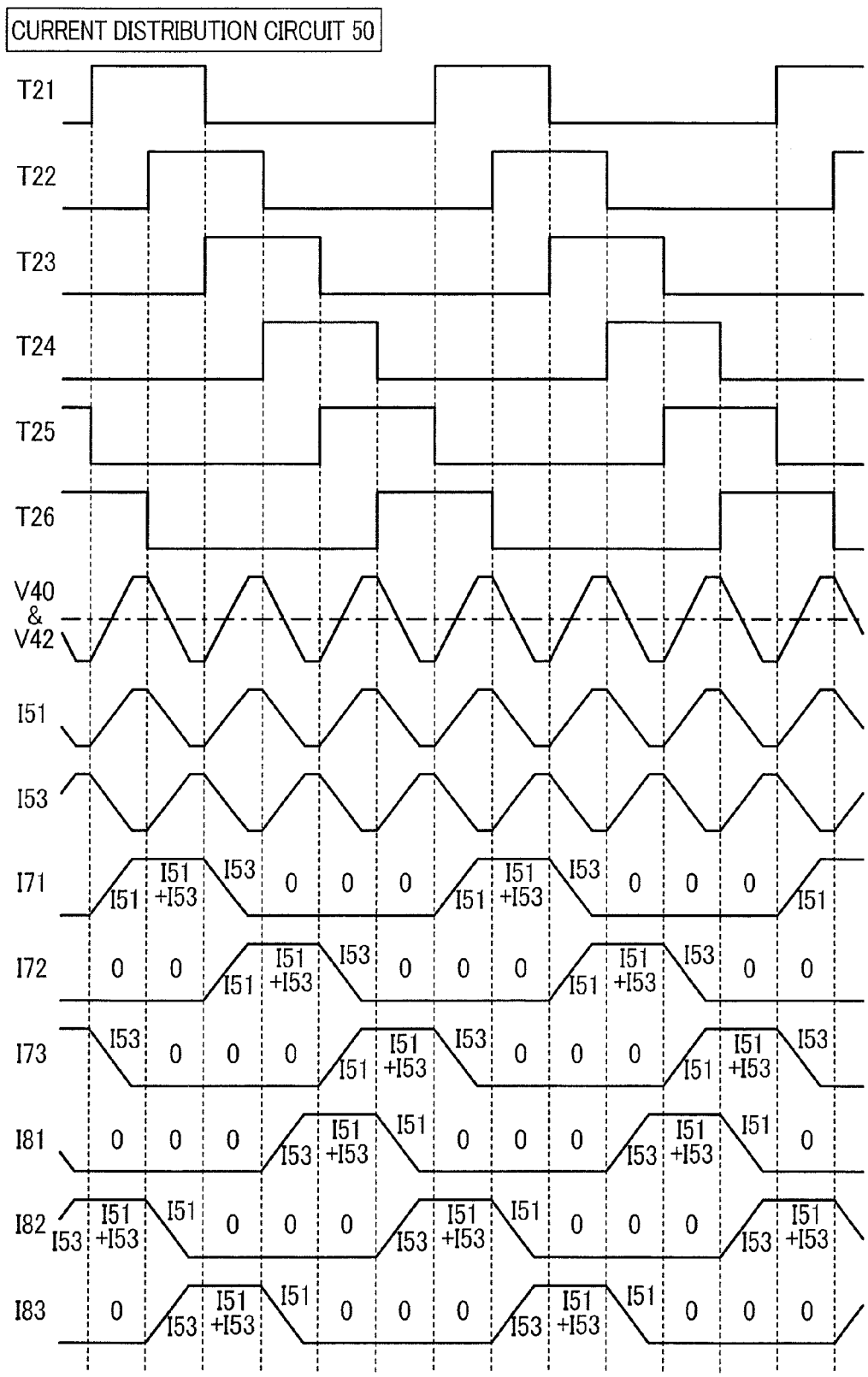
FIG. 9 is a diagram for explaining an operation of a current distribution circuit 50.

The current distribution circuit 50 is configured to generate the trapezoidal wave signals I71 to I73 and I81 to I83 on the basis of the timing signals T21 to T26 and the voltage V40 across the capacitor C1. Here, illustrated in FIG. 9 is the relationship between the timing signals T21 to T26 inputted to the current distribution circuit 50 and the voltage V40 across the capacitor C1 and the trapezoidal wave signals I71 to I73 and I81 to I83 outputted from the current distribution circuit 50.

The collector current according to the difference between the base voltages of the transistors P50 and P51 flows through the transistors P50 and P51. Also, as described above, since the transistors making up each of current mirror circuits are equal in size, the collector currents of the transistors N51 and N53 are equal to the collector currents of the transistors P50 and P51, respectively. Therefore, the collector current I51 according to the difference voltage V40-V42 flows through the transistor N51, and the collector current I53 according to the difference voltage V42-V40 flows through the transistor N53.

While the timing signal T21 is high, no current flows through the transistor P56, and the collector current equal to the collector current I51 of the transistor N51 flows through the transistor P53. While the timing signal T21 is low, the collector current I51 of the transistor N51 flows through the transistor P56, and no current flows through the transistors P52 and P53.

On the other hand, while the timing signal T22 is high, no current flows through the transistor P57, and the collector current equal to the collector current I53 of the transistor N53 flows through the transistor P55. Also, while the timing signal T22 is low, the collector current I53 of the transistor N53 flows through the transistor P57, and no current flows through the transistors P54 and P55.

Therefore, the trapezoidal wave signal I71 satisfies I71=I51 while only the timing signal T21 is high, and rises with the collector current I51 of the transistor N51. While the timing signals T21 and T22 are high, the trapezoidal wave signal I71 satisfies I71=I51+I53, and becomes constant. Further, while only the timing signal T22 is high, the trapezoidal wave signal I71 satisfies I71=I53, and falls with the collector current I53 of the transistor N53. While the timing signals T21 and T22 are low, the trapezoidal wave signal I71 satisfies I71=0, and becomes constant.

As such, the trapezoidal wave signal I71 starts rising at the rising edge of the timing signal T21, and finishes rising in the timing before the rising edge of the timing signal T22, to become constant. Further, the trapezoidal wave signal I71 starts falling at the falling edge of the timing signal T21, and finishes lowering in the timing before the falling edge of the timing signal T22, to become constant. That is, the trapezoidal wave signal I71 starts rising or falling in the timing of 120-degree energization.

Similarly, in the current distribution circuit 50 illustrated in FIG. 5, by inputting the timing signals T23 and T24 instead of the timing signals T21 and T22, the trapezoidal wave signal I72 can be generated. Also, by inputting the timing signals T25 and T26, the trapezoidal wave signal I73 can be generated. Further, by inputting the timing signals T24 and T25, T26 and T21, and T22 and T23, the trapezoidal wave signals I81, I82, and I83 can be generated, respectively.

The current amplifier circuit 61 is configured to amplify the trapezoidal wave signals I71 and I81 in proportion to the speed control voltage Vin, to be outputted as the trapezoidal wave signals I71a and I81a, respectively. Also, the current amplifier circuit 62 is configured to amplify the trapezoidal signals I72 and I82 in proportion to the speed control voltage Vin, to be outputted as the trapezoidal signals I72a and I82a, respectively. Further, the current amplifier circuit 63 is configured to amplify the trapezoidal wave signal I73 and I83 in proportion to the speed control voltage Vin, to be outputted as the trapezoidal wave signals I73a and I83a, respectively.

Figure 10:
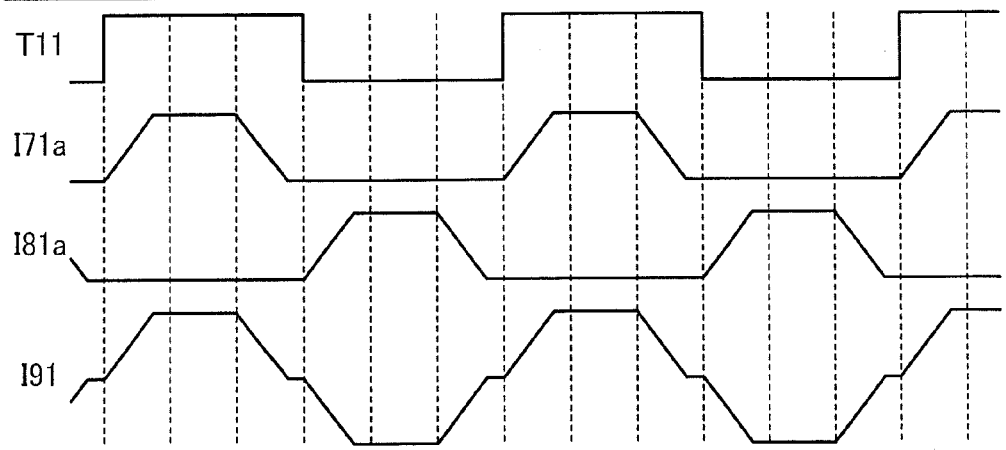
FIG. 10 is a diagram illustrating an example of a drive current supplied from a motor drive circuit according to an embodiment of the present invention to a drive coil of a motor.
Figure 10:
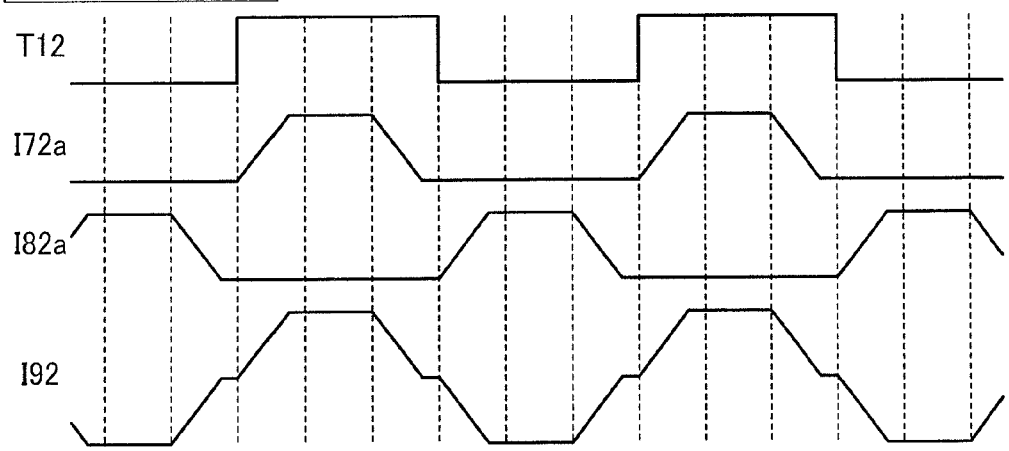
Figure 10:
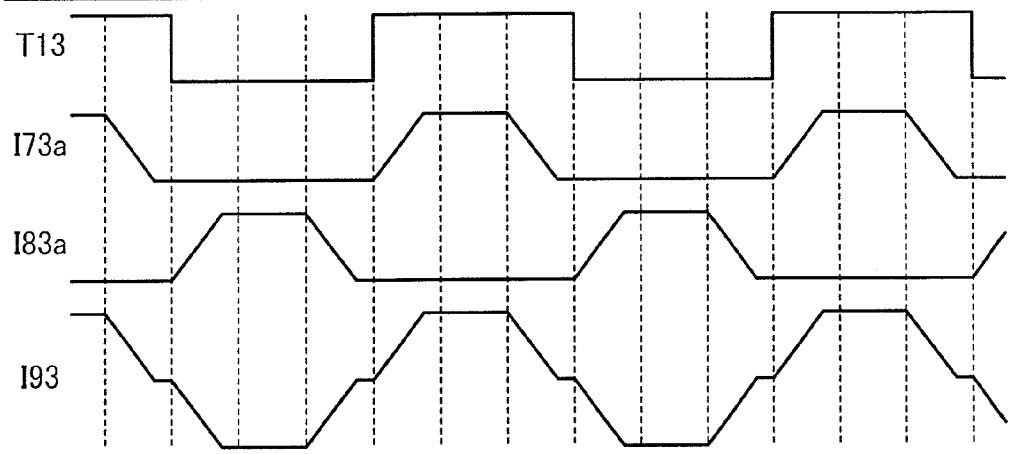

The output transistors 71 and 81 supply a drive current I91 to the U-phase drive coil 91 in accordance with the trapezoidal wave signals I71a and I81a, respectively. Also, the output transistors 72 and 82 supply a drive current I92 to the V-phase drive coil 92 in accordance with the trapezoidal wave signals I72a and I82a, respectively. Further, the output transistors 73 and 83 supply a drive current I93 to the W-phase drive coil 93 in accordance with the trapezoidal wave signals I73a and I83a, respectively. Here, the relationship among the trapezoidal wave signal, the drive current, and the timing signal indicating the timing of 180-degree energization is illustrated in FIG. 10 for each of the U-phase, V-phase, and W-phase.

The output transistors 71 to 73 supply source currents (discharge currents) as the drive currents I91 to I93 in accordance with the trapezoidal wave signals I71a to I73a, respectively. On the other hand, the output transistors 81 to 83 supply sink currents (suction currents) as the drive currents I91 to I93 in accordance with the trapezoidal wave signals I81a to I83a.

For example, while the output transistors 71 and 82 are ON, the drive current flows from the power supply potential VCC to the ground potential through the output transistor 71, the drive coils 91 and 92, and the output transistor 82. Therefore, in this case, the drive current flows from the U-phase to the V-phase. Also, for example, if the output transistors 73 and 83 are ON, the drive current flows from the W-phase to the V-phase.

Figure 11:
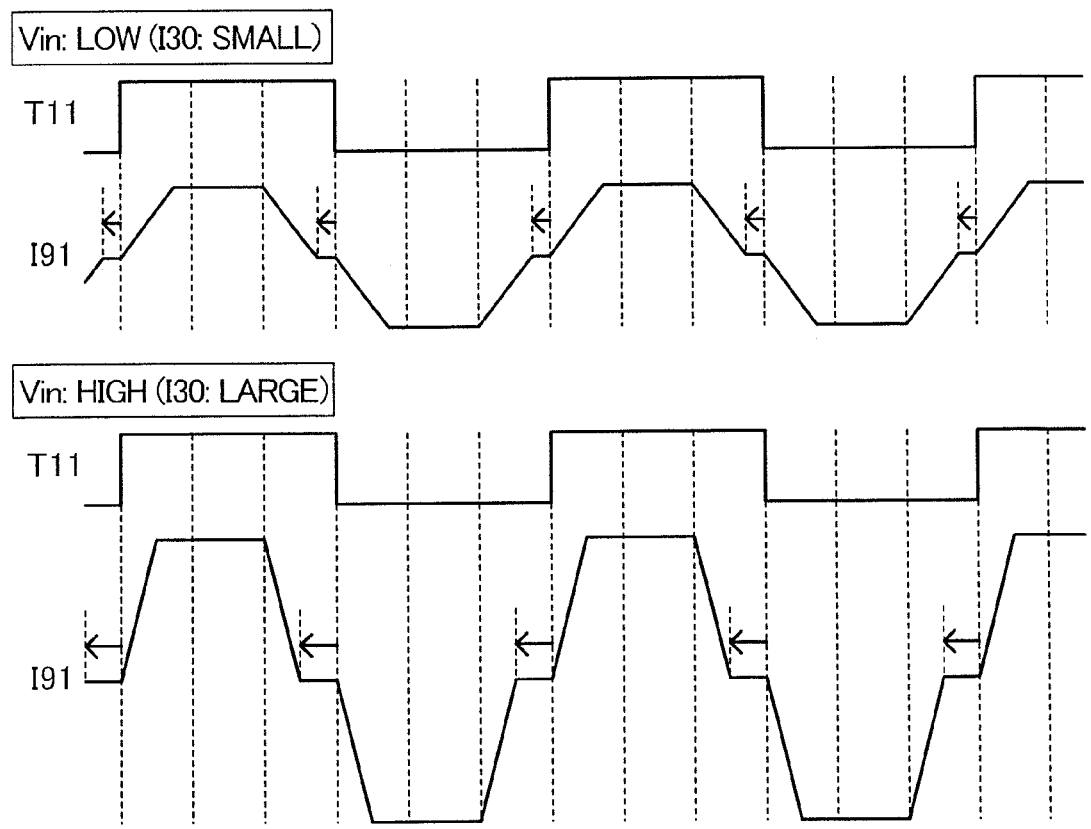
FIG. 11 is a diagram illustrating an example of a drive current supplied to a drive coil of a motor in a low-speed rotation and in a high-speed rotation.

As such, as for the drive currents I91 to I93, the source currents start being supplied at the rising edge of the timing signals T11 to T13, respectively, and stop being supplied in the timing before the falling edge. Also, the sink currents start being supplied at the falling edge of the timing signals T11 to T13, respectively, and stop being supplied in the timing before the rising edge. That is, the switching timing of each of the three phases is advanced as compared to the timing of the 180-degree energization (advanced in phase). Further, as illustrated in FIG. 11, each of the drive currents has the amplitude thereof increased in proportion to the speed control voltage Vin, and the advance angle (advance in phase) becomes greater than that in proportion to the rise in the speed control voltage Vin.

As described above, the motor drive circuit 1 is configured to suppress the influence of the phase delay of the drive currents by advancing the angle of the switching timing of each of the three phases as the rotation speed of the motor 9 rises. Therefore, the motor 9 can sufficiently be increased in rotation speed when high-speed rotation is performed. When low-speed rotation is performed, the advance angle is decreased and becomes close to the case of the 180-degree energization, which enables silencing.

As described above, in the motor drive circuit 1 configured to drive the three-phase brushless DC motor 9, inclination is changed in accordance with the rotation speed or the target rotation speed of the motor 9, so that the trapezoidal wave signal is generated, to be supplied to the output transistor, thereby advancing the switching timing of the three phases in accordance with the rotation speed (or the target rotation speed) of the motor 9, and the rotation speed in the high-speed rotation can be sufficiently increased, with silencing in the low-speed rotation being realized.

Further, by inputting the speed control voltage Vin indicating the target rotation speed of the motor 9 through the terminal 106, the switching timing of the three phases is advanced as the rotation speed is increased, while the rotation speed of the motor 9 is controlled based on the speed control voltage Vin, and the influence of the phase delay of the drive current can be suppressed.

Further, by starting rising or falling of the trapezoidal wave signal in accordance with the timing signals T21 to T26 indicating the energization timing to each of the phases, the switching timing of the three phases is advanced more than the timing of the 180-degree energization, thereby being able to suppress the influence of the phase delay of the drive current.

Further, by amplifying the trapezoidal wave signal in accordance with the speed control voltage Vin to be supplied to the output transistor, the motor 9 can be driven in a linear drive system.

Further, by supplying the charging/discharging current I30 in accordance with the speed control voltage Vin to charge/discharge the capacitor C1, the trapezoidal wave signal including an inclination part whose inclination is according to the inclination of rising or falling of the voltage V40 across the capacitor C1 can be generated.

Further, by amplifying the trapezoidal wave signal in proportion to the speed control voltage Vin as well as by increasing the charging/discharging current I30 more greatly as compared to the increase in proportion to the increase in the speed control voltage Vin in an accelerated manner, the influence of the phase delay of the drive current can be suppressed, which influence becomes more remarkable as the rotation speed of the motor 9 increases.

Further, the rotation position of the rotor is detected by comparing the voltage of each of the phases of the drive coil and the voltage of the neutral point of the drive coil, thereby being able to drive the motor 9 of the sensorless drive system without using the position detection element such as a Hall element.

Further, by supplying, to the output transistor, the trapezoidal wave signal which starts rising or falling in the timing of the 120-degree energization and finishes rising or falling in the timing before the timing of the 180-degree energization, the switching timing of the three phases can always be advanced, and the influence of the phase delay of the drive current can be suppressed.

In an embodiment as described above, the motor drive circuit configured to drive the motor of the sensorless drive system including drive coils with three phases has been described, but it is not limited thereto. The motor drive circuit may drive a brushless DC motor using a position detection element such as a Hall element. Also, t may drive a brushless DC motor including drive coils with four phases or more phases. In general, in the case of a brushless DC motor including drive coils with n phases (n is an integer greater than or equal to 3), each of the trapezoidal wave signals starts rising or falling in the timing of $[180\times(n-1)/n]°$ energization, and finishes rising or falling in the timing before the timing of phase switching of the 180-degree energization.

In an embodiment described above, the speed control voltage Vin indicating the target rotation speed of the motor 9 is directly inputted from the outside to the current supply circuit 30 and the current amplifier circuits 61 to 63, but it is not limited thereto. For example, a speed pulse signal FG whose frequency indicates the rotation speed of the motor 9 may be inputted to an FVC (Frequency to Voltage Converter), and the output voltage of the FVC may be used instead of the speed control voltage Vin.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor drive circuit configured to supply drive currents to drive coils with a plurality of phases of a motor to drive the motor, comprising:
   a trapezoidal wave signal generation circuit configured to output a trapezoidal wave signal whose inclination is changed with a rotation speed of the motor or a target rotation speed of the motor;
   a plurality of output transistors configured to output the drive current to the drive coils, respectively, in accordance with the trapezoidal wave signal; and
   an amplifier circuit configured to amplify the trapezoidal wave signal in accordance with the rotation speed or the target rotation speed, to be supplied to each of the plurality of output transistors,
   wherein the trapezoidal wave signal generation circuit includes a current supply circuit configured to supply a charging/discharging current for charging/discharging a capacitor, in accordance with the rotation speed or the target rotation speed, and the trapezoidal wave signal generation circuit is configured to generate the trapezoidal wave signal including an inclination part whose inclination is according to the inclination of rising or falling of a voltage across the capacitor,
   wherein the amplifier circuit is configured to amplify the trapezoidal wave signal in proportion to the rotation speed or the target rotation speed, and
   wherein the current supply circuit is configured to supply the charging/discharging current in accordance with an increase in the rotation speed or the target rotation speed, the charging/discharging current increasing more greatly as compared to an increase in proportion to an increase in the rotation speed or the target rotation speed.

2. The motor drive circuit according to claim 1, further comprising:
   an input terminal to which a speed control voltage according to the target rotation speed is inputted,
   wherein the trapezoidal wave signal generation circuit is configured to change inclination of the trapezoidal wave signal based on the speed control voltage.

3. The motor drive circuit according to claim 1, further comprising:
   a timing control circuit configured to output an energization timing signal indicating timing for energizing each of the drive coils with the plurality of phases, based on a rotation position of a rotor of the motor corresponding to a phase of said each of the drive coils with the plurality of phases,
   wherein the trapezoidal wave signal generation circuit is configured to start rising or falling of the trapezoidal wave signal in accordance with the energization timing signal.

4. The motor drive circuit according to claim 2, further comprising:
   a timing control circuit configured to output an energization timing signal indicating timing for energizing each of the drive coils with the plurality of phases, based on a rotation position of a rotor of the motor corresponding to a phase of said each of the drive coils with the plurality of phases,
   wherein the trapezoidal wave signal generation circuit is configured to start rising or falling of the trapezoidal wave signal in accordance with the energization timing signal.

5. The motor drive circuit according to claim 3, further comprising:
   a position detection circuit configured to detect the rotation position by comparing a voltage of each of the phases of the drive coils with the plurality of phases and a voltage of a neutral point of the drive coils with the plurality of phases.

6. The motor drive circuit according to claim 4, further comprising:
   a position detection circuit configured to detect the rotation position by comparing a voltage of each of the phases of the drive coils with the plurality of phases and a voltage of a neutral point of the drive coils with the plurality of phases.

7. The motor drive circuit according to claim 3,
   wherein the motor includes drive coils with n phases (n is an integer greater than or equal to 3),
   wherein the timing control circuit is configured to output the energization timing signal of $[180\times(n-1)/n]$ degree energization, and
   wherein the trapezoidal wave signal starts rising or falling in timing of the energization timing signal, and stops rising or falling in timing before timing of 180-degree energization, in accordance with the rotation speed or the target rotation speed.

8. The motor drive circuit according to claim 4,
   wherein the motor includes drive coils with n phases (n is an integer greater than or equal to 3),
   wherein the timing control circuit is configured to output the energization timing signal of $[180\times(n-1)/n]$ degree energization, and
   wherein the trapezoidal wave signal starts rising or falling in timing of the energization timing signal, and stops rising or falling in timing before timing of 180-degree energization, in accordance with the rotation speed or the target rotation speed.

9. The motor drive circuit according to claim 5,
   wherein the motor includes drive coils with n phases (n is an integer greater than or equal to 3),
   wherein the timing control circuit is configured to output the energization timing signal of $[180\times(n-1)/n]$ degree energization, and
   wherein the trapezoidal wave signal starts rising or falling in timing of the energization timing signal, and stops rising or falling in timing before timing of 180-degree energization, in accordance with the rotation speed or the target rotation speed.

10. The motor drive circuit according to claim 6,
    wherein the motor includes drive coils with n phases (n is an integer greater than or equal to 3),
    wherein the timing control circuit is configured to output the energization timing signal of $[180\times(n-1)/n]$ degree energization, and
    wherein the trapezoidal wave signal starts rising or falling in timing of the energization timing signal, and stops rising or falling in timing before timing of 180-degree energization, in accordance with the rotation speed or the target rotation speed.

* * * * *